United States Patent [19]
Radant et al.

[11] Patent Number: 5,673,783
[45] Date of Patent: Oct. 7, 1997

[54] CONVEYOR SYSTEM

[75] Inventors: Steven C. Radant, Wausau, Wis.;
Robert M. Mosher, Fort Myers, Fla.

[73] Assignees: Stainless Specialist Inc., Wausau, Wis.;
Ore-Ida Foods, Inc., Fort Myers, Fla.

[21] Appl. No.: 746,382

[22] Filed: Nov. 8, 1996

[51] Int. Cl.⁶ .................................................. B65G 47/30
[52] U.S. Cl. ...................... 198/418.6; 198/431; 198/446
[58] Field of Search ............................. 198/418.6, 431, 198/418.7, 443, 446, 432

[56] References Cited

U.S. PATENT DOCUMENTS

| | | |
|---|---|---|
| 2,167,343 | 7/1939 | Bergman . |
| 2,699,278 | 1/1955 | Wysocki ........................ 198/446 X |
| 2,847,809 | 8/1958 | Lindeman et al. . |
| 3,106,280 | 10/1963 | Baker . |
| 3,225,513 | 12/1965 | Ehe ................................ 198/431 |
| 3,460,667 | 8/1969 | Lanham, Jr. . |
| 3,604,551 | 9/1971 | Fink . |
| 4,037,710 | 7/1977 | Brutcher ........................ 198/443 |
| 4,252,232 | 2/1981 | Beck et al. . |
| 4,273,236 | 6/1981 | Wahl et al. ..................... 198/432 |
| 4,273,237 | 6/1981 | Wahl et al. . |
| 4,382,471 | 5/1983 | Peterson . |
| 5,101,957 | 4/1992 | Schiek ........................... 198/431 X |

FOREIGN PATENT DOCUMENTS

| | | |
|---|---|---|
| 291464 | 11/1988 | European Pat. Off. . |
| 2514297 | 10/1976 | Germany .......................... 198/418.6 |
| 4223920 | 8/1992 | Japan . |
| 434542 | 12/1992 | Japan . |
| 1668251 | 8/1991 | U.S.S.R. . |

*Primary Examiner*—James R. Bidwell
*Attorney, Agent, or Firm*—Richard C. Litman

[57] ABSTRACT

The present conveyor system includes a single loading or supply conveyor, plural feed conveyors, an alignment conveyor, a tray conveyor, and a return conveyor loop. The downwardly angled supply conveyor delivers randomly distributed articles to the feed conveyors, which carry the articles to the alignment conveyor. The feed conveyors are angled diagonally to the alignment conveyor and pass beneath the alignment conveyor, so that articles which do not enter the compartments at the first portion of the alignment conveyor are carried along with the movement of the diagonal feed conveyors along the path of the alignment conveyor and thereagainst, to enter the alignment conveyor at a later point. The articles aligned in the alignment conveyor compartments are then placed in registry with regularly positioned compartments in product trays carried on a tray conveyor, which passes beneath the alignment conveyor. Articles which are not accepted by the alignment conveyor are carried to the first end of a return conveyor loop, which passes beneath the supply conveyor and carries the articles back to the first end of the feed conveyors adjacent the supply conveyor, for another pass at the aligning conveyor. The system allows all belts to run continuously at a constant speed, and eliminates the need for complex apparatus providing for intermittent operation or other movement of the conveyor system. The system is particularly well suited for the packaging of food products, such as bagels or other baked goods, and may be constructed of stainless steel and/or approved plastic materials.

17 Claims, 4 Drawing Sheets

CONVEYOR SYSTEM

BACKGROUND OF THE INVENTION

1. Field of the Invention

The present invention relates generally to automatic mechanical conveyor systems, and more particularly to such systems used in the food processing industry and comprising multiple cooperating conveyors having lateral and vertical working relationships with one another. The present system provides not only for the alignment and transfer of product elements of one conveyor with containers or trays on another conveyor, but also provides for the return of surplus product elements to the aligning and feed conveyors via a product return conveyor loop.

2. Description of the Invention

The reduction of labor costs is a constant concern in various manufacturing and processing industries, and accordingly various automated product handling systems have been developed. An environment where such systems are perhaps most needed is in the food processing and packaging industry, where various comestible products are mixed, cooked, packaged, and otherwise processed in mass production. The hand labor which would otherwise be required would result in many such products being priced beyond the range of the average consumer.

Accordingly, various conveyor systems have been developed which provide for the automated handling of such comestible products throughout much of the process. Nevertheless, there are certain points in virtually any automated process where human labor is required, or at least where some further automation would be advantageous. One such point has been the handling of surplus articles, particularly food products, which have been conveyed to a packaging area, and which are beyond the capability of the packaging machinery to handle.

The present conveyor system responds to this need, by providing a system which accepts virtually any number of articles (e.g., baked goods) from a downwardly angled loading conveyor, and automatically transfers them onto multiple feed conveyors which operate at an oblique angle to an aligning conveyor. The aligning conveyor aligns the product with a packaging conveyor which passes therebelow. The multiple feed conveyors also transfer surplus articles to a product return conveyor, which loops back to the multiple feed conveyors at a point beside the transfer from the loading conveyor to the feed conveyors, thus allowing the recycled surplus product to be passed to the aligning conveyor and thence to the packaging conveyor, according to the quantity of product which may be accepted by the packaging conveyor. The process continues automatically, with all surplus or recycled product eventually being accepted by the aligning and packaging conveyors, with no manual assistance required. A discussion of the related prior art of which applicants are aware, is provided below.

U.S. Pat. No. 2,167,343 issued on Jul. 25, 1939 to Christian N. Bergman describes a Container Conveyor And Distributor, wherein a single main supply conveyor provides product which is distributed to two branch or distribution conveyors. No provision for the return of surplus articles to the supply point is provided by Bergman, as is accomplished by the present invention.

U.S. Pat. No. 2,847,809 issued on Aug. 19, 1958 to Joseph F. Lindeman et al. describes a Machine For Positioning Articles In Trays, directed to the gentle automated handling of apples and the prevention of bruises or damage thereto. A supply conveyor distributes the apples to a lateral conveyor, which in turn distributes the apples to a tray conveyor by means of suitable automated handling equipment. Additional lateral conveyors are apparently involved, but their function is not clear. The Lindeman et al. system uses intermittently actuated conveyors, whereas the conveyors of the present system are all continuously operated. Also, no means for the return of excess product to the beginning of the distribution loop is provided by Lindeman et al., as is provided by the present conveyor system.

U.S. Pat. No. 3,106,280 issued on Oct. 8, 1963 to David K. Baker describes the Transfer Of Articles Between Moving Conveyor Means, wherein reciprocating "peeling conveyors" intermittently deposit the product (dough for baked goods) in rows onto a receiving conveyor. The receiving conveyor also operates intermittently in steps, so as to coordinate with the peeling conveyors. The present conveyor system operates continuously.

U.S. Pat. No. 3,460,667 issued on Aug. 12, 1969 to William E. Lanham, Jr. describes a Method And Apparatus For Transferring Bakery Products And Similar Articles, comprising two orthogonally disposed conveyor belt systems. One of the belts moves arcuately and reciprocally beneath the other, while the other operates intermittently in registry with the arcuately moving belt. The arrangement provides for the transfer of goods from one belt to the other, or to a tray thereon, but Lanham, Jr. makes no provision for recycling surplus goods to the beginning of the process, nor for accomplishing the process using smoothly and continuously running conveyors operating at a constant speed, as provided by the present conveyor system.

U.S. Pat. No. 3,604,551 issued on Sep. 14, 1971 to Roger H. Fink describes an Article Conveyor Flow Control And Unscrambling Apparatus, wherein a broad supply conveyor transfers goods to a series of three narrow belts using a vibrating transfer plate, with the narrower belts each running at different speeds. The goods are channeled in single file to a narrow output belt, with surplus goods passing laterally to a large number of belts disposed orthogonally to the three narrow belts. The goods are then collected by a return belt running in the opposite direction of the three narrow belts, and thence to yet another belt running oppositely to the plural orthogonal belts, to return surplus goods to the narrow belts. The entire apparatus, with its differential belt speeds and multiple belts, is considerably more complex than the present invention, with its overlying and underlying belts.

U.S. Pat. No. 4,252,232 issued on Feb. 24, 1981 to Ludwig Beck et al. describes a Conveyor System for the processing of cans, wherein cans are delivered to a conveyor adapted to accept such cans in tandem, in a continuous single line. While Beck et al. provide for the return of surplus cans to the supply conveyor, no means is provided for the alignment of goods laterally in a tray conveyor, as provided by the present conveyor system.

U.S. Pat. No. 4,273,237 issued on Jun. 16, 1981 to Alois Wahl et al. describes a Device For Feeding Containers, Especially Bottles, To Processing Machines, Especially Container Cleaning Machines. The supply conveyor system comprises a plurality of separate narrow belts, feeding into a plurality of entrances to another belt system at a shallow angle. No return of surplus articles is disclosed, as provided by the closed loop return of the present conveyor system.

U.S. Pat. No. 4,382,471 issued on May 10, 1983 to Charles L. Peterson describes a Low Damage Beet Cleaner And Elevator, comprising a horizontal delivery belt and a generally vertically disposed belt having a plurality of projections extending therefrom to hold the beets on the belt as they are carried upwardly. The vertical belt runs faster than the horizontal belt, to produce a brushing effect on the beets to provide some cleaning effect. No disclosure is made of loading of the product in registry with trays having plural rows, nor is any return path provided for the recycling of surplus product, as provided by the present conveyor system.

Japanese Patent Publication No. 4-223,920 published on Aug. 13, 1992 illustrates a sorting device for cylindrical objects, in which the objects are axially aligned by a series of alternatingly lifted sloped segments. The segments do not move laterally, as a conveyor belt, but rather alternately lift and descend to cause the products to roll according to the direction of the sloped segments. No return of surplus product to the sorter, is disclosed. Japanese Patent Publication No. 4-345,425 published on Dec. 1, 1992 illustrates a sorting device in which a plurality of objects are delivered on a single wide conveyor belt to a series of longitudinally disposed fences which provide a plurality of narrow lanes adapted to fit a single product at a time on the same belt. Surplus product is channeled to another conveyor running in the opposite direction, but no disclosure is made as to the final disposition of the surplus product, nor is any disclosure made of placement of the product in registry with trays. European Patent Publication No. 291,464 published on Nov. 17, 1988 illustrates a supply conveyor which transfers a product to a second conveyor at approximately a 60 degree angle thereto. However, the product is already aligned on the supply conveyor, unlike the random distribution provided by the supply conveyor of the present system, and the additional apparatus provided to align the product in registry with multiple compartment trays. No disclosure is made of any return means for surplus product, in the French publication.

Finally, Soviet Patent Publication No. 1,668,251 published on Aug. 7, 1991 illustrates a delivery and surplus product return system, using two parallel belts running in opposite directions. The second belt includes a plurality of diagonal fences thereacross, which serve to urge the product into channels to one side of the second belt. Surplus product which bypasses these channels, is carried back to the first belt by the diagonal fences. The present conveyor system utilizes multiple feed belts running diagonally to the aligning conveyor, rather than belts using diagonal fences which would interfere with the overlying fences of the overrunning alignment conveyor.

None of the above inventions and patents, either singly or in combination, is seen to describe the instant invention as claimed.

SUMMARY OF THE INVENTION

Accordingly, it is a principal object of the invention to provide an improved conveyor system including a plurality of conveyor belts, particularly adapted for the distribution of randomly loaded products in registry with a plurality of uniformly distributed tray compartments of trays carried on a tray conveyor.

It is another object of the invention to provide an improved conveyor system which conveyor belts operate continuously and smoothly at a constant speed.

It is a further object of the invention to provide an improved conveyor system including a return conveyor loop for the return of surplus product to the beginning of the distribution system.

An additional object of the invention is to provide an improved conveyor system which includes plural feed conveyors which transfer the randomly distributed product to an aligning conveyor, which in turn places the aligned product into the receptacles of trays carried on the tray conveyor.

Still another object of the invention is to provide an improved conveyor system which is compact, by means of vertically stacked overrunning and underrunning conveyor belts.

It is an object of the invention to provide improved elements and arrangements thereof in an apparatus for the purposes described which is inexpensive, dependable and fully effective in accomplishing its intended purposes.

These and other objects of the invention will become readily apparent upon further review of the specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
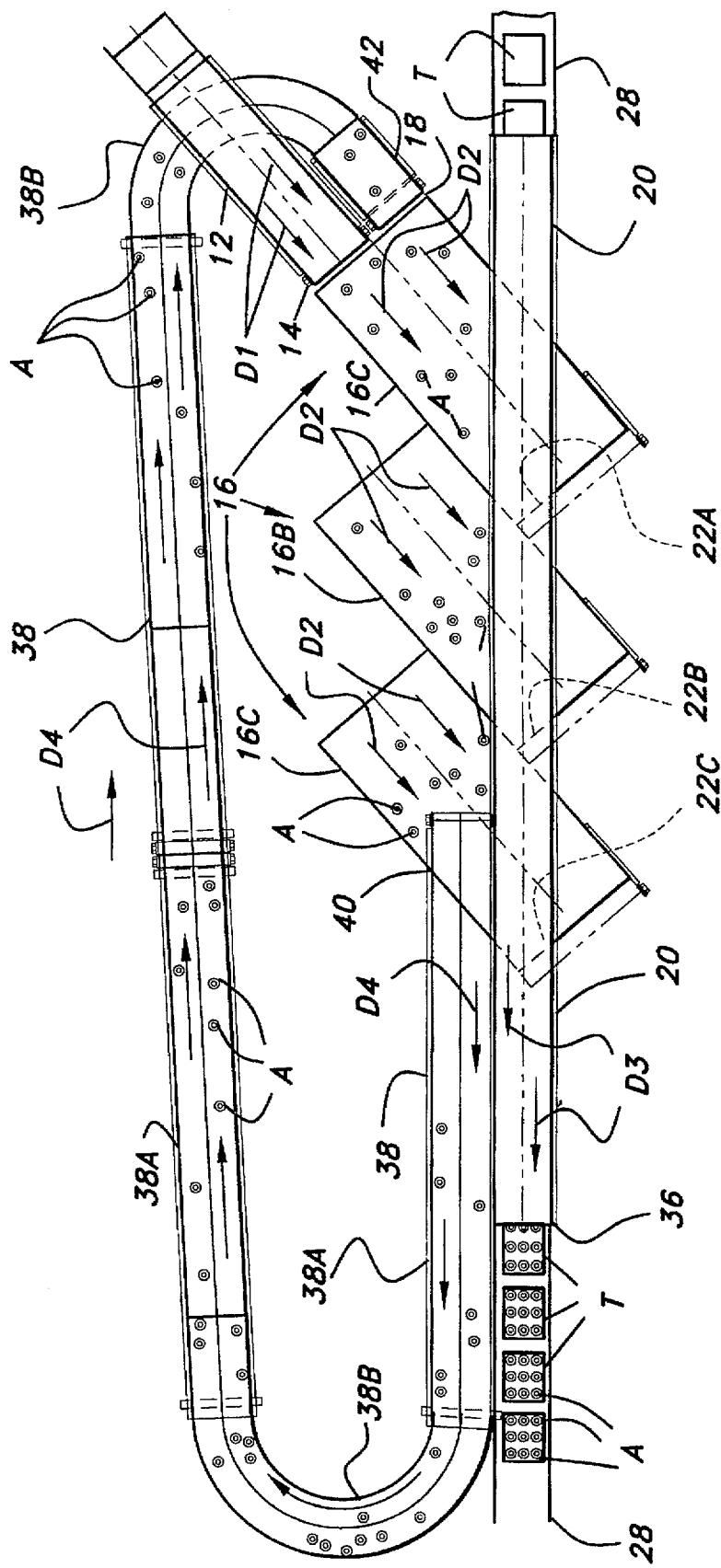
FIG. 1 is a schematic top plan view of the present conveyor system, showing its general layout.

The present invention comprises a conveyor system, generally designated with the numeral 10 in the drawings, which provides for the automatic orderly packaging of articles from a loading conveyor upon which the articles are loosely and randomly distributed. The present conveyor system 10 also automatically provides for the return of excess articles, beyond the number which the packaging is capable of accepting, to the front of the system for another pass. While the present system 10 may be used to handle and package virtually any type of loose articles, it is particularly well adapted for use in the food manufacturing and processing industry for the automated handling of such products as bagels and the like. Accordingly, the present system is preferably constructed of materials suitable for use in the food industry, i. e., 304 alloy stainless steel or other suitable corrosion resistant steel, and/or a variety of plastics which have been approved for use in the food industry by the United States Department of Agriculture (USDA).

Figure 2:
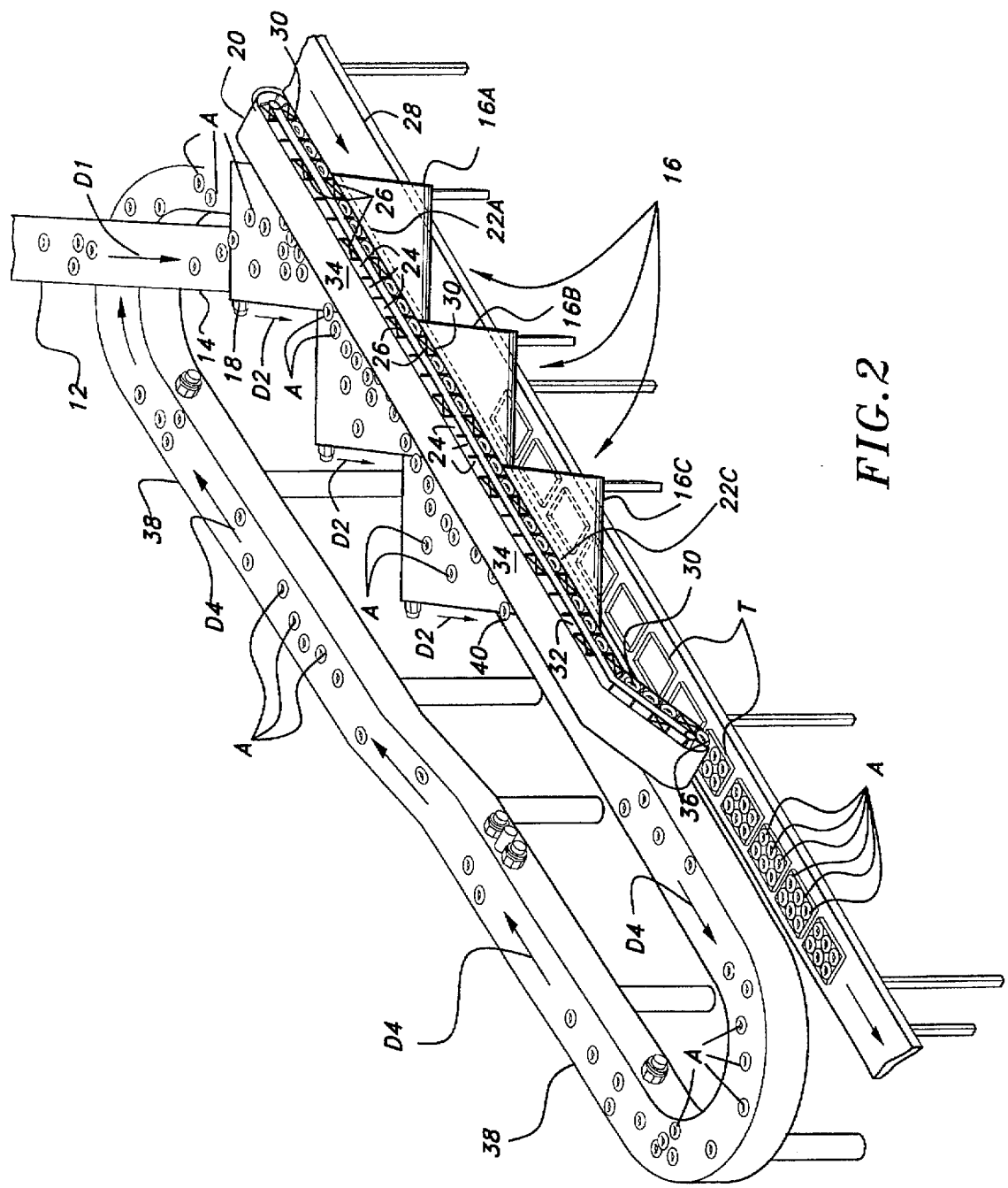
FIG. 2 is a schematic perspective view of the present conveyor system.

FIGS. 1 and 2 respectively provide complete schematic top plan and perspective views of the present conveyor system 10. The conveyor system 10 includes a loading conveyor 12, which delivers the product from another area (baking oven, etc.) to the remainder of the system 10. The conveyor 12 is an endless belt type conveyor, and may be formed of multiple segments (not shown) with means (not shown) to transfer the articles from one segment to another, as required. The directional arrows D1 indicate the direction of travel of the top surface of the loading conveyor 12.

The output end 14 of the loading conveyor 12 abuts a feed conveyor means 16, which comprises one or more feed conveyor belts. Preferably three such belts are used, as shown in the drawing figures and designated as feed conveyors 16a, 16b, and 16c. More or fewer such belts may be used as desired or required for the specific application of the present system 10. The feed conveyor 16, or its first belt 16a, has an input end 18 abutting the output end 14 of the loading conveyor 12, with means (not shown) providing for the smooth transfer of articles A, e.g., bagels or the like, from the loading conveyor 12 to the feed conveyor means 16. The articles A continue to advance along the upper surface of the feed conveyor means 16, as indicated by the directional arrows D2.

Figure 3:
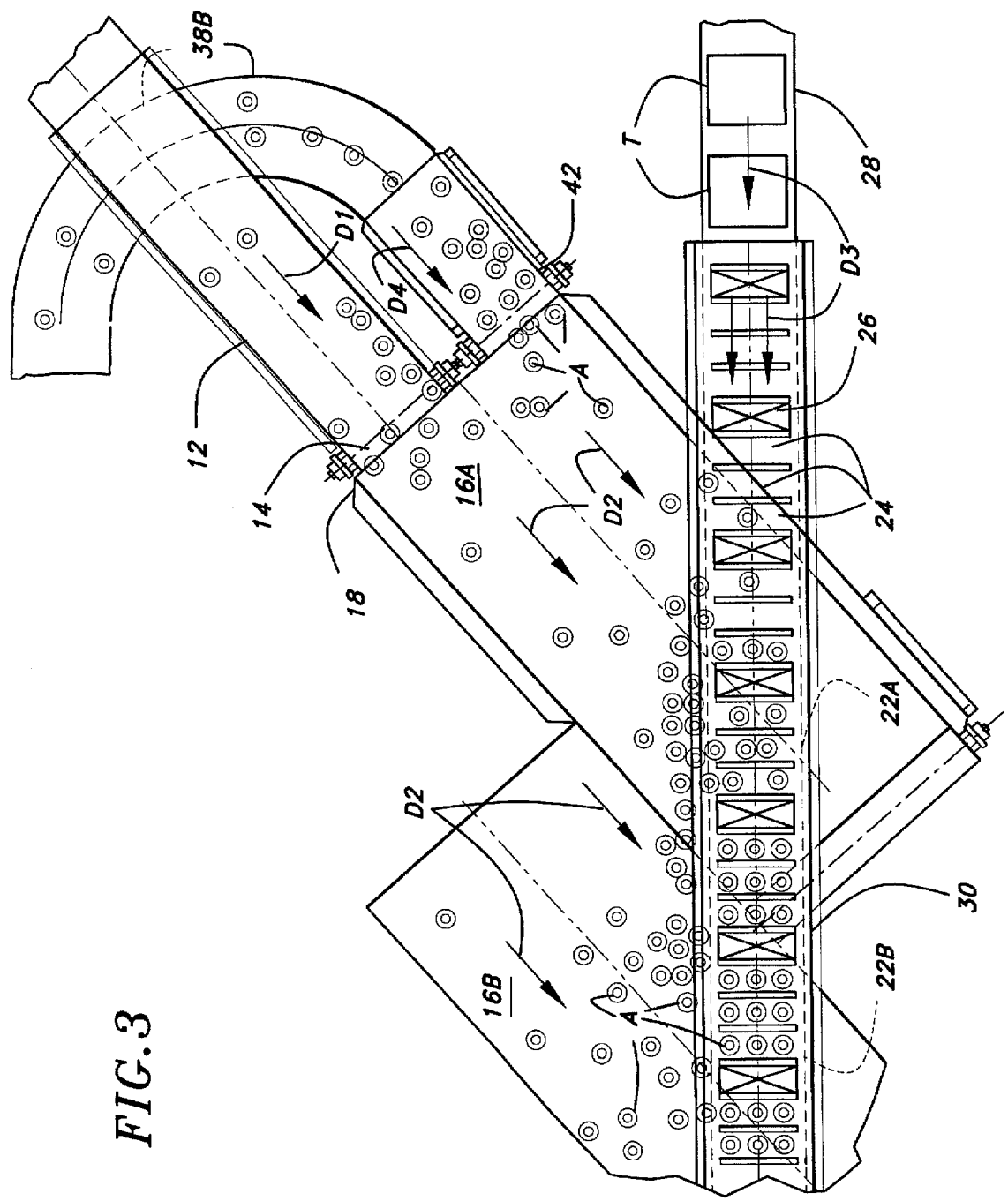
FIG. 3 is a schematic top plan view of the loading or supply portion of the present system.

An aligning conveyor 20 is positioned diagonally across and immediately above the output ends 22a/22b/22c of the feed conveyor 16. This aligning conveyor 20 includes a plurality of lateral compartments 24 thereon, adapted to receive articles A from the feed conveyor(s) 16 in registry with the compartments 24. The aligning conveyor 20 and its compartments 24 are substantially the same width as the packaging or trays T into which the articles will be placed by the present conveyor system 10, e.g., having a width equal to three of the articles A, as shown in FIGS. 2 and 3. The present system may be adapted for other packaging and tray widths, as required. As the trays T are dimensioned to provide a three by three matrix of articles A therein, the compartments 24 are similarly arranged, with three compartments 24 and a closed area 26 to allow for the spacing between trays T on the tray conveyor 28.

The lower surface 30 of the aligning conveyor 20 is that portion which actually serves as the product or article carriage surface for the conveyor 20, and this lower surface 30 is spaced just above the upper surface of the feed conveyor(s) 16 a distance equal to the depth of the compartments 24. Directional arrows D3 indicate the direction of travel of the lower or product carriage surface 30 of the alignment conveyor 20. The empty or return portion of the conveyor 20 is the upper surface 32; these two surfaces 30 and 32 are more clearly shown in the perspective view of FIG. 2 and the partial view of FIG. 4. Accordingly, the aligning conveyor 20 is enclosed by a housing or shroud 34, with the exception of its output end 36, in order to retain the articles A within the compartments 24 of the aligning conveyor 20.

The tray conveyor 28 is disposed parallel to the aligning conveyor 20 and below the feed conveyor(s) 16 and aligning conveyor 20, and conveys empty trays T from the input or right hand side of the system of FIGS. 1 and 2, and carries the trays T beneath the feed and aligning conveyors 16 and 20. The output end 36 of the aligning conveyor 20 extends beyond and descends past the output end(s) of the feed conveyor(s) 16, to meet the upper surface of the tray conveyor 28 immediately above the trays T. The aligning conveyor 20 and tray conveyor 28 run at identical speeds, in order to remain in precise registry with one another. The aligning conveyor 20, having had the compartments 24 filled with articles A as the conveyor 20 passed immediately over the feed conveyor(s) 16, then deposits these articles A in registry in the trays to.

The present conveyor system is adapted to accept virtually any reasonable quantity of product from the loading conveyor, and is set up so that normally, a surplus of the product will be provided in order to assure that every compartment 24 of the aligning conveyor 20 is filled. This assures that each of the corresponding trays T, passing below the aligning conveyor 20, will have every compartment thereof filled completely. However, the surplus of articles A delivered to the aligning conveyor 20, requires some means of processing the surplus further.

Accordingly, a product return conveyor 38 is provided having an input end 40 adjacent to and coplanar with the output or return end of the feed conveyor means 16, e.g., the return end 22c of the last feed conveyor 16c in the line of plural feed conveyors 16. The product return conveyor 38 forms a closed loop, continuing back to an output end 42 abutting and coplanar with the input end 18 of the feed conveyor means 16, e. g., the end of the first feed conveyor 16a where multiple feed conveyors are provided. The output end 42 is preferably located immediately adjacent the output end 14 of the loading conveyor 12, with the feed conveyor means 16 providing delivery of articles A from both the loading conveyor 12 and return conveyor 38 to the aligning conveyor 20, as indicated by the directional arrows D4. This return conveyor 38 preferably uses flexible belt means (e.g., interlinked material, etc.) to provide for passage around curves, and may comprise several straight and curved segments 38a and 38b communicating with one another for the continual movement of articles A therealong, as shown in FIG. 1.

FIG. 3 is a detailed schematic plan view of the loading end of the conveyor system 10. It will be noted in FIG. 3, that only the lower surface 30 of the aligning conveyor 20 is shown; the upper or return surface 32 and overlying product retaining shroud 34 are deleted, to show more clearly the operation of the system 10. FIG. 3 provides a clearer view of the supply of trays T being delivered along the tray conveyor 28, and their passage beneath the overlying lower surface 30 of the aligning conveyor 20, which in turn overlies the output end(s) 22 of the feed conveyor(s) 16. FIG. 3 also clearly shows the closure 26 of every fourth compartment 24 of the aligning conveyor 20, to allow for the space between trays T on the tray conveyor 28. It will also be noted that the last curved section 38b of the product return conveyor 38, passes beneath the downwardly disposed loading conveyor 12. The above described arrangement provides a very compact conveyor system 10, providing all functions in a very compact area.

Figure 4:
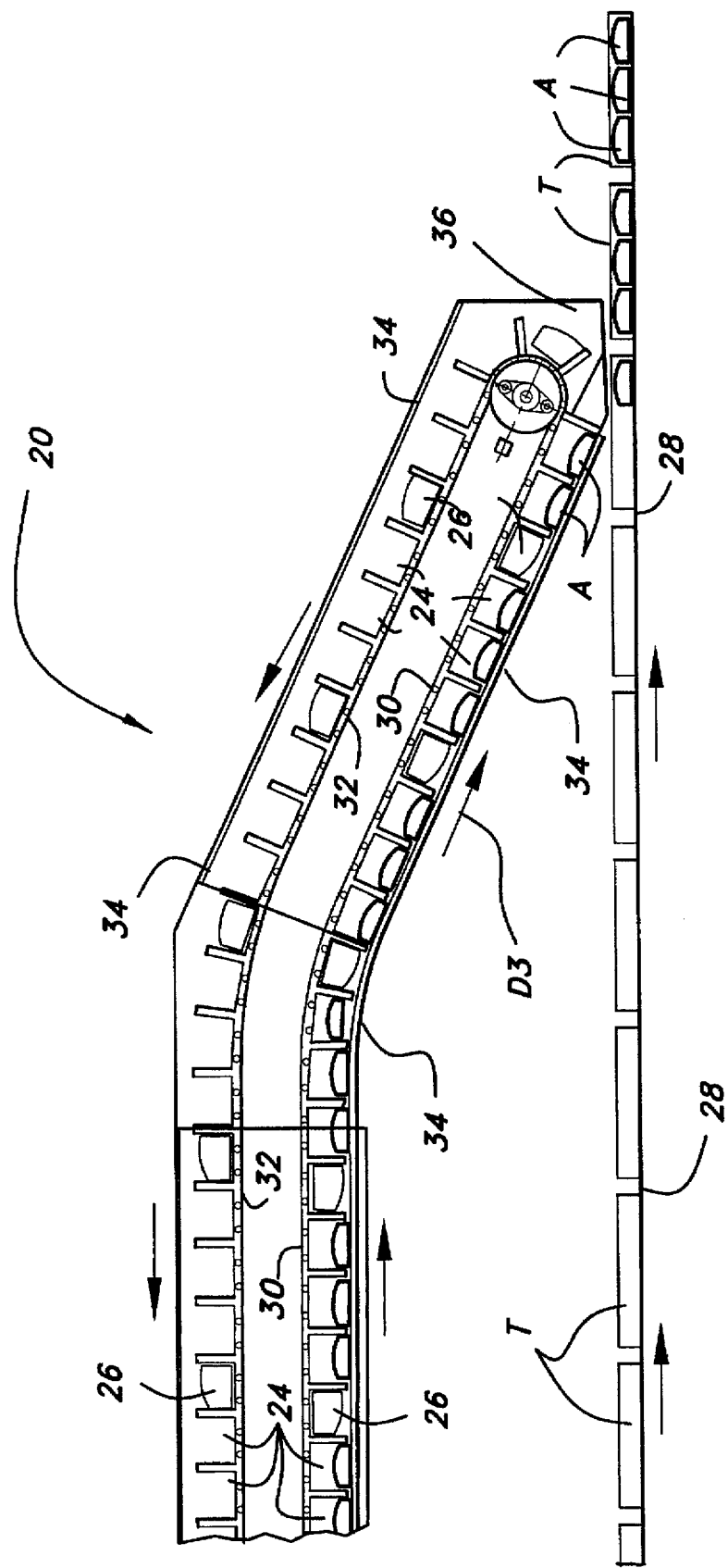
FIG. 4 is a schematic side elevation view of the aligning and tray conveyors and their relationship.

FIG. 4 is a schematic elevation view of the output end of aligning conveyor 20, and its downwardly disposed end immediately overlying the tray conveyor 28. Again, a closure 26 is provided between every three compartments 24 of the aligning conveyor 20, for spacing between trays T on the tray conveyor 28. This spacing may be adjusted, depending upon the size of the trays and spacing therebetween. The aligning conveyor 20 drops the articles A from its underlying compartments 24 through the open output end 36, and into the underlying trays T. The shroud 34 holds the articles A in their compartments 24 until the open output end 36 is reached.

In summary, the present conveyor system 10 provides for the smooth delivery of randomly distributed articles A from a loading conveyor 10 to an orderly packaging of the articles A in trays T carried on a tray conveyor 28, by one or more feed conveyors 16 and an aligning conveyor 20. The articles A are conveyed to the lower level 30 of the compartmented aligning conveyor 20 by the feed conveyor(s) 16 constantly urging the articles A toward and into the compartments 24 of the aligning conveyor 20, due to the convergence of the two. The product return conveyor 38 serves to return any excess articles A not accepted by the aligning conveyor 20, back to the first feed conveyor 16a for another pass along the aligning conveyor 20 for packaging. The entire system 10 is adapted to run smoothly and continually without interruption, with no intermittent or reciprocating action being required, thus simplifying the apparatus and allowing the system 10 to be operated by generally conventional motive means (motors, chains, gear reductions, etc.).

The present conveyor system 10, with its overlying and underlying conveyor means and continuous, constant speed operation of all conveyor belts in the system, provides a compact assembly which requires relatively little floor space to accomplish the multiple operations provided by the present system. This results in a significant savings in operational costs for a user of the present system, with resulting advantages in production efficiency.

It is to be understood that the present invention is not limited to the sole embodiment described above, but encompasses any and all embodiments within the scope of the following claims.

We claim:

1. A conveyor system, comprising:

a loading conveyor having an output end, and providing randomly distributed articles to said conveyor system;

feed conveyor means having an input end abutting said output end of said loading conveyor and accepting the randomly distributed articles therefrom, and an opposite return end;

an aligning conveyor having a lower product carriage surface and an upper return surface and disposed diagonally to said feed conveyor means with said lower product carriage surface immediately overlying said feed conveyor means, said aligning conveyor including a plurality of laterally disposed compartments thereacross and accepting and placing the articles from said feed conveyor means in registry with said laterally disposed compartments of said aligning conveyor;

a tray conveyor disposed beneath and parallel to said aligning conveyor, with said tray conveyor having an upper surface removably conveying a plurality of evenly spaced compartmented trays thereon and a lower return surface;

at least said aligning conveyor and said tray conveyor being adapted to operate at equal velocities, so that said lower surface of said aligning conveyor and said upper surface of said tray conveyor are in exact registry with one another and said compartments of said aligning conveyor are in continual registry with the compartments of the evenly spaced trays being conveyed on said tray conveyor;

said tray conveyor passing beneath said feed conveyor means, with said tray conveyor and said alignment conveyor each extending beyond said feed conveyor means and with said alignment conveyor having an output end positioned immediately above said tray conveyor and providing for the placement of articles from said laterally disposed compartments of said alignment conveyor in registry into the trays being conveyed on said tray conveyor;

a product return conveyor extending from said return end of said feed conveyor means to said input end of said feed conveyor means, with said product return conveyor generally forming a closed loop having an input end adjacent to and coplanar with said return end of said feed conveyor means and an opposite output end abutting and coplanar with said input end of said feed conveyor means and adjacent to said loading conveyor, with said product return conveyor providing for the return of excess articles from said return end of said feed conveyor means to said input end of said feed conveyor means for distribution to said aligning conveyor, and;

said loading conveyor, said feed conveyor means, said aligning conveyor, said tray conveyor, and said product return conveyor each being adapted to operate smoothly and continually at a constant velocity without interruption.

2. The conveyor system according to claim 1, wherein:

said system is adapted for use in the processing and handling of food, and is constructed of materials selected from the group consisting of stainless steel and USDA approved plastics.

3. The conveyor system according to claim 1, wherein:

said feed conveyor means comprises a plurality of parallel conveyors.

4. The conveyor system according to claim 1, wherein:

said product return conveyor comprises a plurality of straight and curved segments.

5. The conveyor system according to claim 1, wherein:

said product return conveyor includes a curved return end segment underlying said loading conveyor.

6. A conveyor system, comprising:

a loading conveyor having an output end, and providing randomly distributed articles to said conveyor system;

feed conveyor means having an input end abutting said output end of said loading conveyor and accepting the randomly distributed articles therefrom, and an opposite return end;

an aligning conveyor having a lower product carriage surface and an upper return surface and disposed diagonally to said feed conveyor means with said lower product carriage surface immediately overlying said feed conveyor means, said aligning conveyor including a plurality of laterally disposed compartments thereacross and accepting and placing the articles from said feed conveyor means in registry with said laterally disposed compartments of said aligning conveyor;

a tray conveyor disposed beneath and parallel to said aligning conveyor, with said tray conveyor having an upper surface removably conveying a plurality of evenly spaced trays thereon and a lower return surface;

at least said aligning conveyor and said tray conveyor being adapted to operate at equal velocities, so that said lower surface of said aligning conveyor and said upper surface of said tray conveyor are in exact registry with one another and said compartments of said aligning conveyor are in continual registry with the compartments of the evenly spaced trays being conveyed on said tray conveyor;

said tray conveyor passing beneath said feed conveyor means, with said tray conveyor and said alignment conveyor each extending beyond said feed conveyor means and with said alignment conveyor having an output end positioned immediately above said tray conveyor and providing for the placement of articles from said laterally disposed compartments of said alignment conveyor in registry into the trays being conveyed on said tray conveyor, and;

said loading conveyor, said feed conveyor means, said aligning conveyor, and said tray conveyor each being adapted to operate smoothly and continually at a constant velocity without interruption.

7. The conveyor system according to claim 6, including:

a product return conveyor extending from said return end of said feed conveyor means to said input end of said feed conveyor means, with said product return conveyor generally forming a closed loop having an input end adjacent to and coplanar with said return end of said feed conveyor means and an opposite output end abutting and coplanar with said input end of said feed conveyor means and adjacent to said loading conveyor, with said product return conveyor providing for the return of excess articles from said return end of said feed conveyor means to said input end of said feed conveyor means for distribution to said aligning conveyor.

8. The conveyor system according to claim 7, wherein:

said product return conveyor comprises a plurality of straight and curved segments.

9. The conveyor system according to claim 7, wherein:

said product return conveyor includes a curved return end segment underlying said loading conveyor.

10. The conveyor system according to claim 6, wherein:

said system is adapted for use in the processing and handling of food, and is constructed of materials selected from the group consisting of stainless steel and USDA approved plastics.

11. The conveyor system according to claim 6, wherein: said feed conveyor said feed conveyor means comprises a plurality of parallel conveyors.

12. A conveyor system, comprising:

a loading conveyor having an output end, and providing randomly distributed articles to said conveyor system;

feed conveyor means having an input end abutting said output end of said loading conveyor and accepting the randomly distributed articles therefrom, and an opposite return end;

an aligning conveyor having a lower product carriage surface and an upper return surface and disposed diagonally to said feed conveyor means with said lower product carriage surface immediately overlying said feed conveyor means, said aligning conveyor including a plurality of laterally disposed compartments thereacross and accepting and placing the articles from said feed conveyor means in registry with said laterally disposed compartments of said aligning conveyor;

a tray conveyor disposed beneath and parallel to said aligning conveyor, with said tray conveyor having an upper surface removably conveying a plurality of evenly spaced trays thereon and a lower return surface, with each of the trays having a plurality of regularly spaced article compartments therein;

at least said aligning conveyor and said tray conveyor being adapted to operate at equal velocities, so that said lower surface of said aligning conveyor and said upper surface of said tray conveyor are in exact registry with one another and said compartments of said aligning conveyor are in continual registry with the compartments of the evenly spaced trays being conveyed on said tray conveyor;

said tray conveyor passing beneath said feed conveyor means, with said tray conveyor and said alignment conveyor each extending beyond said feed conveyor means and with said alignment conveyor having an output end positioned immediately above said tray conveyor and providing for the placement of articles from said laterally disposed compartments of said alignment conveyor in registry into the trays being conveyed on said tray conveyor and;

a product return conveyor extending from said return end of said feed conveyor means to said input end of said feed conveyor means, with said product return conveyor generally forming a closed loop having an input end adjacent to and coplanar with said return end of said feed conveyor means and an opposite output end abutting and coplanar with said input end of said feed conveyor means and adjacent to said loading conveyor, with said product return conveyor providing for the return of excess articles from said return end of said feed conveyor means to said input end of said feed conveyor means for distribution to said aligning conveyor.

13. The conveyor system according to claim 12, wherein:

said loading conveyor, said feed conveyor means, said aligning conveyor, said tray conveyor, and said product return conveyor are each adapted to operate smoothly and continually at a constant velocity without interruption.

14. The conveyor system according to claim 12, wherein:

said system is adapted for use in the processing and handling of food, and is constructed of materials selected from the group consisting of stainless steel and USDA approved plastics.

15. The conveyor system according to claim 12, wherein: said feed conveyor means comprises a plurality of parallel conveyors.

16. The conveyor system according to claim 12, wherein: said product return conveyor comprises a plurality of straight and curved segments.

17. The conveyor system according to claim 12, wherein: said product return conveyor includes a curved return end segment underlying said loading conveyor.

\* \* \* \* \*